Patented June 2, 1931

1,808,429

REISSUED

SEP 29 1942

UNITED STATES PATENT OFFICE

HENRY R. MINOR, OF OSSINING, NEW YORK, ASSIGNOR, BY MESNE ASSIGNMENTS, TO THE LIQUID CARBONIC CORPORATION, A CORPORATION OF DELAWARE

METHOD OF REGULATING AND MAINTAINING HEAT TRANSFER

No Drawing. Application filed February 7, 1928. Serial No. 252,676.

This invention relates to the method of controlling temperature and more particularly the temperature of gas or other media under pressure, for example as is employed in the curing of rubber tires and the like.

The object of the invention is to provide a simple and efficient method of controlling temperature in curing, cooking, distilling under pressure, etc., and more particularly where an inert gas effect is desired.

Further objects of the invention will appear more fully hereinafter.

My invention includes the discovery that by employing an inert gas under pressure in conjunction with steam under pressure any desired control or maintenance of temperature conditions may be effected whereby heat transfer and curing effects, distilling under pressure, etc., can be economically, efficiently and readily effected.

If any receptacle is supplied with a means for supplying an inert gas such as $CO_2$ under pressure and another additional means for supplying steam at a fixed pressure both lines being supplied with separate controls so that each may be supplied separately and used in amount as desired, then, by varying the pressure and thereby the amount of inert gas supplied to the receptacle initially and then shutting off the inert gas supply and turning on the steam supply at a fixed pressure it is possible to obtain any desired temperature condition from a maximum of the total available heat units contained in the steam at the fixed pressure down to a minimum where no steam and consequently no heat units are added to the receptacle. As illustrative of this; if in a container an inert gas as $CO_2$ is first admitted at an initial pressure of approximately 50 pounds and if the supply of $CO_2$ is then shut off and steam is added to the container at say 100 pounds pressure the first effect will be the resultant expansion of the said $CO_2$ within the container as a result of the direct contact with the steam. This expansion will continue with increased pressure effect until the pressure of the $CO_2$ has increased to the point where its pressure had cut down the partial pressure of the steam supply to the point where the partial pressure of the steam corresponded in temperature with the temperature within the container. In other words in the above cited case (and this case does not purport to be mathematically accurate but only illustrative) the $CO_2$ would probably expand to about 80 pounds pressure as a result of the temperature effect so that with steam maintained at 100 pounds pressure there is a differential of 20 pounds. 20 pounds correspond to 260° F. 260° of temperature is sufficient to cause the expansion of $CO_2$ from 50 pounds to 80 pounds. Consequently a state of equilibrium has been reached which can be changed only as a result of heat transfer. Now if heat transferring occurs within the container the effect of heat transfer will be to cause a decrease in temperature of the mixed gases. A decreased pressure results and immediately the partial pressure of the steam is raised so that additional heat units are available to maintain the temperature equilibrium. From the above it should be plainly evident that as a result of my discovery temperature equilibrium can be secured and maintained to suit any desired conditions.

It will be seen, therefore, that when an expansible gas is brought into contact with steam within an enclosed container (the pressure of the gas being lower than that of the steam) the pressure within the container will be the pressure of the steam. Part of that pressure, however, which I will term the "partial" pressure, is made up by the two factors—(a) the cold initial pressure of the gas, and (b) the pressure of the gas expanded by the heat imparted thereto by the steam. The "partial" pressure within the chamber attributable to the gas may be varied at will by varying the relatively cold initial pressure of the gas.

Inasmuch as the temperature of the gas mixture is dependent upon the "partial" pressure of the gas when expanded as a result of the steam added thereto and it is limited only by the temperature corresponding to the partial pressure of the steam employed in conjunction therewith, by merely controlling the pressure of the initial gas from a minimum to the maximum pressure of the steam employed, I am able to effectively control the temperature of the gas and steam within the chamber.

The practical applicability of the invention is, therefore, readily apparent. In all instances where heat transfer is desired my invention permits a simple economical and extremely efficient transfer of heat controlled solely by the pressure of inert gas employed. Where the peculiar antioxidant and preservative effects well recognized for carbon dioxide are desired the employment of this gas has an additional feature of enabling the utilization of such antioxidant and preservative effects.

I have discovered, furthermore, that not only am I enabled to obtain any degree of temperature desired within the limit of the temperature of the heating media such as steam employed with the inert gas, by merely controlling the pressure of the inert gas but I have also discovered that the temperature once established is automatically maintained. Variation in the partial pressure of the gas can occur only as the result of giving up heat units with resultant temperature decrease. Variation in the partial pressure of the steam can occur only as a result of the condensation of the steam which occurs when heat units are given up. Thus in the example given, the partial pressure of the gas within the receptacle will vary because of heat transfer from the gas or because of condensation of the steam in combination therewith. Any variation in the pressure of the gas steam mixture due to either of the aforementioned causes, causes a variation in temperature. If the temperature decreases by reason of variation of the "partial" pressure of the gas additional heat units are automatically supplied by the steam incident to the immediate increase of "partial" pressure of the steam. In other words, the constant supply of the steam in any given set of conditions in addition to the constant supply of the gas in any given set of conditions imparts an automatic valve effect which automatically establishes a balanced condition within the container and maintains that condition.

In effect, therefore, I have provided an automatic valve for controlling and maintaining constant temperature and heat transfer or temperature equilibrium whereby these factors may be efficiently and readily controlled by the simple expedient of controlling the pressure of the inert gas with respect to a fixed steam pressure.

One advantage of the process is the relatively short time required to bring the mixture of carbon dioxide gas and steam to the desired temperature and the resultant even temperature which can be maintained thereafter until the desired results are obtained. The particular adaptability of the process in the curing of tires and tubes is evident. With the admission of carbon dioxide gas at a predetermined pressure, the results can be accurately determined and the desired temperature controlled with great accuracy. In previous methods, as outlined above, a comparatively long period of time has been required for raising the temperature within the vulcanizer to curing temperature, this being especially true in the vulcanizing of rubber articles of considerable thickness or volume of rubber. With the combined use of carbon dioxide and steam in the manner herein set forth, the period of time required for raising the temperature to the proper point for vulcanization is shortened materially, so that the effective temperature for vulcanization is reached in a shorter time than possible with other methods which have preceded my invention. The process has the further advantage that the addition of steam to the carbon dioxide gas gives an acid reaction to the mixture which is extremely beneficial in the vulcanization of articles of or containing rubber, giving superior ageing qualities, greater tensile strength, superior texture and other advantages.

The foregoing simple statement of the invention is in no sense commensurate with the importance or extent of the industrial applications thereof. The method described can be utilized in a great many ways and in a great many industries. While I will hereinafter describe one concrete example, to wit: the curing of tubes and tires in the tire industry, I wish it to be understood that the invention can be equally well applied in curing rubber boots, shoes, overshoes, etc., in the rubber shoe industry and in fact in curing any rubber goods where long life and decrease or minimizing of deterioration due to oxidation is desirable, or where the additional benefits are desired to be obtained which accrue as a result of securing greater density in rubber goods, more freedom from air bubbles and greater adhesion as a result of using higher pressures hitherto impractical. Likewise the same process may be applied in pressure distillation operations, preserving foods, etc. Broadly stated, the invention may be utilized in any industry where it is desired to effect temperature pressure control under inert gas conditions. Similarly, while in connection with the example selected for illustration $CO_2$ is the inert gas selected, it will be understood that my invention is not to be limited or restricted in this respect, and any fluid, liquid or gaseous, (such as for example as alcohol or carbon dioxide) may be employed.

To enable a clear understanding of the applicability of my invention to the art of curing tires and tubes, a brief consideration will be given to the processes heretofore employed. It is, of course, well recognized that the fundamental requirements in the curing of cord tires is that of uniformity of the product permitting equal quality particularly in the larger sizes. The necessity for this requirement will be readily apparent when it is considered that a manufacturer is offered scant opportunity to explain to a customer who has a car equipped with four tires of standard make and who finds that the wear and life of the four tires is strikingly dissimilar. It is well recognized that difficulties in the curing of the tire are generally, if not always, found to be the cause. The two principal processes heretofore employed in the commercial curing of the tires are known as the "air-glycerine process" and the "hot water process". In the air-glycerine process it is customary to add small amounts of glycerine or other preservative to the air bag from time to time as a preventative of oxidation. In curing with this process pressure is supplied with air. This process has the advantage of being relatively simple, the life of the air bag is not unduly shortened, and the time of curing is not unduly lengthened. The air-glycerine process has its disadvantages, however. Leakage of air into the heater from the manifold and air bag connections during the process of the cure is its most objectionable feature. In practice it has been found that from two to four times as much air passes into the heater to mix with steam as is actually required for pressure purposes. Air settling to the bottom of the heater causes under curing of the tires and, likewise, tends to form air pockets. Wherever air pockets occur a badly cured tire results. Furthermore, air mixed with steam interferes seriously with the heat transfer from steam to the mold. This condition has been one of the most serious encountered in the rubber industry with the air-glycerine process. Some operators of this method endeavor to decrease the effect of this serious disadvantage by agitating the steam mixture. Others blow off large quantities of steam from the bottom of the heater to remove air even though the expense of so doing ranges from $25.00 to $100.00 per day. Still others both agitate the steam or mixture and blow off the steam. From these facts may be gathered the seriousness with which the disadvantages above enumerated inherent to the use of the air-glycerine process are regarded by the industry.

In addition to this main disadvantage are secondary ones some of which are incident to the efforts to minimize the effects thereof. For example, a dope of some kind to protect the inner surface of the air bag from the effects of oxidation has been employed. The effect of the dope, however, is to soften the inner surface of the bag and in a measure this must be compensated for by an added thickness of the bag, which in itself is disadvantageous. In adding dope to an air bag there is a gradual accumulation, and the amount will vary from bag to bag with respective bags causing consequent variations in the tire cure, depending upon which bag is employed. Furthermore, the "spitting" of dope when removing old bags from tires causes further variation, loss, painful burns to the operators and slippery floors thereabout, increasing the hazard of operating conditions as well as the inconvenience thereof, to say nothing of sanitary effects. Again, the air used to supply and maintain pressure frequently carries water and oil with it so that on examination of an air bag at the end of its life it is frequently found to have a large volume of a heterogeneous mixture of dope, oil and water, all of which tend to shorten the life of the bag. Likewise, the last tires cured by that bag receive a very different cure from those when the bag was new.

The hot water process was not extensively adopted until quite recently, principally because it was difficult to induce the installing of a different process which did not offer any apparent advantage from a veiwpoint of air bag life and air bag cost over the air-glycerine process, especially where such installations and maintenance were expensive. This process, however, has the advantage of enabling curing from two sides thus permitting a quicker cure. With the advent of thicker tires, made necessary by the phenominal growth of buses, however, the hot water process began to be generally adopted. With eight, ten, and twelve ply tires in daily production by the large tire manufacturers it is obvious that where heat is supplied from the outside of the tire (as in the air-glycerine process) the inner plies of the tire are going to be in an uncured state. In the hot water process it is customary to apply all of the pressure with hot water, air being removed from the bag by an initial application of steam which also serves to raise the initial temperature of the air bag. This process, like the air-glycerine process, has its advantages. The addition of heat units to the inside of the bag so that curing progresses from two sides towards the center is manifestly an advantage, particularly in view of the bus tire development. Likewise, the hot water system obviates the principal disadvantage of the air-glycerine system because when hot water is used as the pressure medium there will be no leakage of air from the manifold and bag connections to mix with the steam in the heater. Consequently the transfer of heat units from the steam to the mold are superior to what are obtained in the air-glycerine process.

The disadvantages of the hot water process, aside from its high cost of installation and maintenance, reside in the poor relative life obtained from the air bags due to the weakening effect of water and the harsh treatment of the bags themselves by reason thereof; wet floors and tables, the necessity of evacuating the bags with a costly vacuum system, the cost of raising the water to a high temperature and pumping it at a high temperature, the hazard attendant to its use, and the effect of only a slight leakage when the medium pumped is of an incompressible nature. Furthermore, while water transfers heat rapidly at the start, it rapidly cools off, and it is not possible to maintain uniform temperature conditions within the air bag.

A third process, known as the "carbon dioxide process" has recently been the subject matter of considerable comment and experiment in the art. The claimed advantages therefor have been that the bag would be dry at all times, permit a more uniform cure than that obtained with the air-glycerine process and enhance the air bag life. On the other hand, the objectionable features of gas leakage into the steam of the vulcanizer remains and this process offered no means for adding heat to the inside of the tires. Thus the most that was urged for the carbon dioxide process was that a slight saving was secured over the air-glycerine process.

The application of the process of my present invention enables securing the advantages of the air-glycerine process, the hot water process and the carbon dioxide process with complete elimination of the disadvantages of all, as applied to the curing of cord tires, for example in a pot heater, or as applied to the curing of molded tubes in individual or multiple type heaters. Thus, applying the principle of my invention to this particular industry, the receptacle in this instance would be the bag and the process would consist in first bringing up a part of the pressure with an inert gas such as $CO_2$ to a predetermined pressure, then shutting off the gas and turning on steam at the curing pressure and leaving it on throughout the period of cure. The first effect of the steam is to heat up the inert gas, as hereinbefore explained, causing it to expand thus cutting down the "partial" pressure of the steam that can enter at the bag thereby insuring an inner temperature of any desired amount which may be easily computed for any desired case.

It will be understood that the values for the pressure and temperature will vary according to the surrounding conditions as well as the particular type of material being treated or cured. I will give two examples which are approximately standard conditions met in the art.

*First example—in the curing of tires where two hundred pounds internal pressure is ordinarily used.*—In this example let us assume that it is desired to effect curing of tires at 260° F. or 20 pounds gauge pressure, and the pressure maintained on the air bag and thence to the tire in the mold is 200 pounds. The factor to be determined is the proper gauge pressure of the $CO_2$ which when backed by 200 pounds of steam will maintain the same curing temperature within the bag as exists without the mold. 200 pounds gauge pressure is approximately equal to 215 pounds absolute pressure. Steam having a temperature of 260° F. is equivalent to 20 pounds gauge pressure of steam or 35 pounds absolute pressure. Inasmuch as the maximum absolute pressure in the bag will be 215 pounds (the absolute pressure of the steam) and the desired temperature—to wit: 260° F.—is equivalent to 35 pounds absolute pressure of steam the difference between 215 pounds absolute pressure and 35 pounds absolute pressure—to wit: 180 pounds absolute pressure—is the absolute "partial" pressure of the $CO_2$ within the bag. Assuming the original temperature of $CO_2$ is 100° F. (560° absolute) the absolute temperature of $CO_2$ at 260° F. is approximately 720° absolute. Therefore, the product of the absolute "partial" pressure of the gas and the absolute temperature of the gas at its original temperature divided by the absolute temperature of the gas at the desired temperature of the bag (to wit: 720° absolute) gives the absolute pressure of the gas at its original temperature (to wit: 100° F.) required to establish and maintain within the bag a temperature of 260° F. This value in the example given is 139.86 absolute pressure which is equivalent to approximately 125 pounds gauge pressure. Therefore, to meet these requirements, employing steam at 200 pounds gauge pressure and establishing and maintaining a temperature within the bag of 260° F. $CO_2$ at a gauge pressure of 125 pounds is employed.

*Second example—in the curing of tubes where one hundred pounds internal pressure is ordinarily used, desired temperature 260° F.*—Assuming the same curing conditions as in the preceding example, then 100 pounds gauge pressure of steam is equivalent to 115 pounds absolute pressure. The pressure of steam equivalent to 260° F. is 20 pounds gauge pressure or 35 pounds absolute. Subtracting the absolute pressure of the steam at the desired temperature from the absolute pressure of the steam supplied determines the "partial" pressure of the $CO_2$ under the desired conditions—to wit: 80 pounds absolute pressure. Again, assuming the original temperature of $CO_2$ is 100° F. or 560° absolute, then the temperature of the $CO_2$ at the desired temperature—to wit: 260° F.—is equivalent to 720° absolute and the product of the "partial" pressure of $CO_2$ and of the absolute original temperature of the $CO_2$ divided by the absolute temperature of $CO_2$ at the desired operating temperature is the absolute pressure of the $CO_2$ required. In this instance 62.2 absolute pressure results or 47.2 gauge pressure. From the foregoing it will be seen that any desired temperature or pressure conditions may be effected.

The advantage of employing $CO_2$ as the inert gas, particularly in the curing the tubes and tires, will be apparent from a consideration of the fact that it acts as a preservative for the inner surface of the air bag preventing oxidation.

The advantage of employing $CO_2$ in conjunction with steam is as great as the advantage of employing $CO_2$ over air in many cases. For example, in the actual curing of some molded tubes tensile tests showed the following results: tubes cured on air a tensile of 3025 pounds; tubes cured on $CO_2$ a tensile of 3100 pounds; tubes cured on $CO_2$ and steam tensile of 3375 pounds. These same tubes after being aged six days in the Geer oven show tube cured on air tensile 3400 pounds; tube cured on $CO_2$ 3575 pounds; tube cured with $CO_2$ and steam tensile 3900 pounds.

The amount of inert gas used is relatively small and the cost negligible. In general only one-third of the pressure is supplied with gas and, if desired, two-thirds of this may be easily recovered for reuse. By employing steam in lieu of air a substantial reduction of cost is effected inasmuch as the air ordinarily used in curing tires costs approximately 1¢ per tire while steam costs less than 50¢ per thousand pounds. By using steam for an added and maintaining pressure in the bag the leakage of air into the heaters is entirely eliminated. Likewise, by eliminating air in the heater the tires at the bottom of the heater receive exactly the same cure as those at the top (in pot heaters holding from twenty to thirty tires piled one on top of the other). This has constituted one of the main advantages of the hot water process. There is no accumulation in the air bag and consequently the cure does not vary between different bags as in the air-glycerine process. The pressure means employed being entirely gaseous permits the complete function by the blow down at the end of the cure. This eliminates the necessity of collapsing the air bags by a costly vacuum system as in the hot water process with its loss of time and its weakening effect on the bags.

Carbon dioxide increases air bag life. This gas has been used in the past on many and all kinds of air bags when it has been proven in practice that the presence of gas black in large amounts reacts unfavorably with carbon dioxide, the bag becoming porous and the gas black at curing temperatures acting to break down $CO_2$. Iron oxide also acts in a somewhat similar manner. The bag should be preferably of some other mixtures. Practically all tests in the past have been made with gas liquefied at high pressure in cylinders and the users have not stopped to consider that this product was an excellent dehydrating agent. So long as the air bag is not used beyond 75 heats it is not so important but beyond this point the cumulative effect of a dehydrating agent becomes increasingly evident both in the superficial appearance of the interior of the bag and in its physical characteristics. The discovery that carbon dioxide should be used moist in order to secure its most desirable characteristics was one of importance. Under favorable conditions $CO_2$ increases the life of air bags from 20% to 30%.

Assuming an air bag of one-half cubic foot volume. If the hot water is added at a temperature of 350° F., which during the cure drops to a temperature of 250° F., the total number of B. t. u.'s available is $\dfrac{62 1/4}{2} \times 100 =$ 3121 B. t. u.'s. If in the employment of my present invention only 4 pounds of steam are condensed 4000 B. t. u.'s are released for heating and there is a vast practical difference between removing 30 odd pounds of water on the one hand and removing a matter of four pints at the most. As a matter of fact, fewer heat units are needed to be added to the bag when employing my invention because of the reduced thickness thereof required as compared with the thickness of the bag employed in the hot water process.

As a further illustration of the applicability of the process of my invention attention may be called to the advantages secured by the use of this process in the manufacture of molded tubes. The employment of the process of my present invention to the curing of molded tubes has enabled a 25% reduction in curing time required and the quality of the tubes produced in accordance therewith has been found to be consistently uniform and outstandig as compared with tubes cured by ay other process.

It will, therefore, be readily understood from the foregoing that I have provided a simple and highly efficient method far reaching in its effect and scope in industrial application. The principle of the process permits of wide and varied application. Attempts have been made in the past to utilize steam for curing purposes but due to the fact that for any set pressure there is a corresponding temperature of the steam and the further fact that it has heretofore not been practical to use steam in excess of around 40 to 60 pounds because its corresponding temperature was too high such attempts have failed. There are advantages, however, in employing the greater pressure ordinarily obtained with steam, which advantages it has been impossible to obtain because of the excessive corresponding temperature. This applies not only to the tire curing industry but to numerous other industries as well. It will be readily apparent, therefore, that by the automatic control effected by the inert gas in accordance with my invention it is possible to employ practically any pressure of steam desired and at the same time secure the beneficial effects of using an inert gas, and eliminating the disadvantages of using increased steam pressure by being able to control at will the temperature of the mixture within the chamber wholly irrespective of the temperature of the steam corresponding to the pressure utilized.

Having now set forth the objects and nature of my invention and having set forth the principles upon which it is based, as well as an application thereof by a specific industry, what I claim as new and useful and of my own invention and desire to secure by Letters Patent is:—

1. The method of controlling temperature for heat transfer which comprises supplying carbon dioxide to a receptacle and controlling the pressure of the carbon dioxide, supplying steam to said receptacle at a predetermined pressure and supplying additional steam as required to replace the heat lost.

2. The method of controlling temperature for heat transfer which comprises supplying carbon dioxide to a receptacle in the desired amount, supplying steam to a receptacle at a predetermined pressure and continuing to supply steam as required to maintain the desired temperature.

3. The method of establishing a heated medium for heat transfer which comprises supplying a fluid to an enclosed receptacle and supplying a heated fluid at a higher pressure to said receptacle, shutting off the supply of said fluid and maintaining the supply of heated fluid whereby the pressure of the heated fluid and the pressure of the first fluid together with the pressure resulting from the expansion of the first fluid through contact with the heated fluid equals the maximum pressure supplied to the receptacle, and pre-ascertaining the pressure of the first fluid to obtain the desired temperature within the receptacle.

4. The method of establishing a heated medium for heat transfer which comprises supplying carbon dioxide gas under pressure to an enclosed receptacle shutting off said supply and maintaining a supply of steam under pressure to said receptacle whereby the pressure within the receptacle is equal to the pressure of the steam and effected partially by the carbon dioxide gas and establishing the pressure of the carbon dioxide gas supplied to the receptacle so that the corresponding partial pressure of the steam within the receptacle is of a value corresponding to that of the desired temperature.

5. The method of controlling temperature for heat transfer which comprises supplying an inert gaseous fluid to a receptacle under a predetermined pressure, then shutting off the supply thereof, then continuously supplying a relatively hotter gaseous fluid to said receptacle at a predetermined pressure.

6. The method of controlling temperature for heat transfer which comprises supplying carbon dioxide to a receptacle at a predetermined pressure, then shutting off the supply thereof and supplying steam throughout the process to said receptacle at a relatively greater pressure.

7. The method of curing rubber tubes which comprises admitting carbon dioxide under pressure to the interior thereof, shutting off the supply of the carbon dioxide, then continuously admitting steam under a relatively greater pressure to the tube, the pressure of the carbon dioxide being at such value that the partial pressure of the steam within the tube is at that value necessary to have the desired temperature.

8. The method of obtaining and maintaining a desired temperature with fluid pressure which consists of expanding a gas within a container by the subsequent and maintained addition of a heated vapor at a higher temperature and pressure.

9. The method of obtaining and maintaining a desired temperature by fluid pressure which consists of expanding carbon dioxide within a container by the subsequent maintained addition of steam.

10. The method of obtaining and maintaining a desired temperature for heat transfer by means of fluid pressure which consists in supplying a gas at a predetermined pressure to a heat transfer chamber, shutting off the supply of said gas, then supplying a heated fluid at a higher fixed pressure, and maintaining the supply of said heated fluid to automatically compensate for loss of heat units within said chamber.

11. In fluid pressure heat transfer systems, the step of initially utilizing a gas for reducing the partial pressure of a subsequently and continuously supplied heated vapor at higher pressure.

12. The method of utilizing fluid pressure to obtain and maintain a desired temperature for heat transfer which comprises supplying a gas to a container, then supplying a heated fluid at greater pressure to said container and finally utilizing the heated fluid alone to replace heat units lost in said container.

13. The method of obtaining and maintaining a desired temperature for heat transfer which comprises supplying a gas and a heated fluid to a receptacle and utilizing a continuous supply of heated fluid alone for maintaining the temperature within said receptacle.

14. The method of obtaining and maintaining a desired temperature for heat transfer by means of fluid pressure which comprises admitting carbon dioxide and steam into a closed receptacle and maintaining the resultant temperature within said receptacle by a continued supply of the steam alone.

15. The method of obtaining and maintaining a desired temperature with fluid pressure which consists of expanding a gas within a container by the subsequent and maintained addition of a heated condensible vapor at a higher temperature and pressure.

16. The method of obtaining and maintaining a desired temperature with fluid pressure which consists of expanding a gas within a container by the subsequent and maintained addition of steam at a higher temperature and pressure.

17. The method of obtaining and maintaining a desired temperature for heat transfer by means of fluid pressure which consists in supplying a gas at a predetermined pressure to a heat transfer chamber, shutting off the supply of said gas, then supplying steam at a higher fixed pressure and maintaining the supply of said steam to automatically compensate for loss of heat units within said chamber.

18. In fluid pressure heat transfer, the step of initially utilizing a gas for reducing the partial pressure of subsequently and continuously supplied steam at higher pressure.

19. The method of utilizing fluid pressure to obtain and maintain a desired temperature for heat transfer which comprises supplying gas to a container, then supplying steam at greater pressure to said container and finally utilizing the steam alone to replace heat units lost in said container.

20. The method of obtaining and maintaining a desired temperature for heat transfer which comprises supplying a gas and steam to a receptacle and utilizing a continued supply of steam alone for maintaining the temperature within receptacle.

21. The process of vulcanizing rubber articles under internal pressure, comprising introducing into the article inert gas at a predetermined pressure, subsequently connecting the interior of the article with a source of steam to the said article at a pressure greater than the pressure of the inert gas, and maintaining the connection with the steam during the process of vulcanization.

22. The process of vulcanizing rubber articles under internal pressure, comprisng introducing into the article inert gas at a predetermined pressure, subsequently connecting the interior of the article with a source of steam at a pressure greater than the pressure of the inert gas, and maintaining the temperature within the article constant during the process of vulcanization by the addition of steam under pressure.

23. The process of vulcanizing rubber articles under internal pressure, comprising introducing within the article inert gas at a predetermined pressure, adding steam under pressure to raise the temperature of the contents of the article to a fixed curing temperature, and continuing the steam supply to replace heat units lost in the process of vulcanization.

24. The process of vulcanizing rubber articles comprising subjecting the articles to inert gas at a predetermined pressure, adding steam at a higher pressure to raise the inert gas to vulcanizing temperature, and replacing heat units lost by the inert gas by adding more steam thereto during the process of vulcanization.

25. In the process of vulcanization, the steps of supplying inert gas under pressure and raising the temperature thereof by adding steam thereto, and maintaining the temperature of the mixture by additional increments of steam.

26. In the process of vulcanizing articles by a mixture of steam and inert gas under pressure and at the desired temperature, comprising supplementing the loss of pressure and heat by the mixture by additional steam under pressure as the vulcanization progresses.

27. In the vulcanization of articles of or containing rubber, the steps of subjecting the article to a mixture of carbon dioxide and steam, the steam being supplied at a temperature higher than that required for vulcanization, the carbon dioxide and steam being supplied at different initial pressures, the differential in pressure of steam over carbon dioxide determining the temperature of the mixture at which vulcanization is to be carried on.

28. In the vulcanization of articles of or containing rubber, the steps of subjecting the article to a mixture of carbon dioxide and steam supplied at different initial pressures. the differential in pressure of steam over carbon dioxide determining the temperature of the mixture, at which vulcanization is to be carried on, and replacing lost heat units and pressure by the addition of higher pressure steam to the mixture.

29. In heat pressure methods of treating articles of or containing rubber, including the vulcanizing process, the step of subjecting the same to carbon dioxide brought to vulcanizing temperature by admixture with steam under pressure.

30. In the method of curing rubber articles, the step of subjecting rubber articles to the combined action of carbon dioxide and steam.

In testimony whereof I have hereunto set my hand on this 3rd day of February A. D. 1928.

HENRY R. MINOR.